Feb. 21, 1956  E. W. MARLOWE ET AL  2,736,017
DISPLAY INDICATOR AND CONTROL SYSTEM
Filed Jan. 24, 1952  7 Sheets-Sheet 1

INVENTORS
Elbert W. Marlowe and
BY  Lloyd V. Lewis
W. L. Stout
THEIR ATTORNEY

Feb. 21, 1956
E. W. MARLOWE ET AL
2,736,017
DISPLAY INDICATOR AND CONTROL SYSTEM
Filed Jan. 24, 1952
7 Sheets-Sheet 2
| POSITION | A | B | C | D | SYMBOL |
|---|---|---|---|---|---|
| 1 | 0 | 0 | 0 | 0 | □ |
| 2 | 0 | 0 | 0 | 1 | 5 |
| 3 | 1 | 1 | 0 | 1 | 1 |
| 4 | 0 | 0 | 1 | 0 | 2 |
| 5 | 0 | 0 | 1 | 1 | 4 |
| 6 | 1 | 1 | 0 | 0 | 9 |
| 7 | 0 | 0 | 1 | 1 | 3 |
| 8 | 0 | 1 | 1 | 1 | 6 |
| 9 | 1 | 0 | 0 | 0 | 8 |
| 10 | 0 | 0 | 0 | 1 | — |
| 11 | 0 | 1 | 1 | 1 | 7 |
| 12 | 0 | 1 | 0 | 0 | 0 |
Fig. 2.
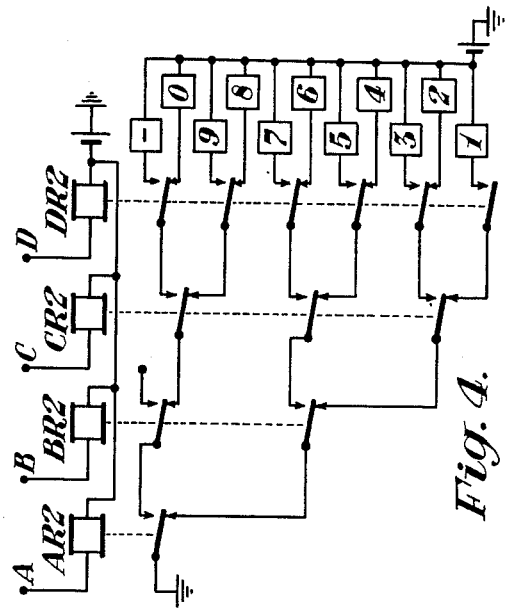
Fig. 4.
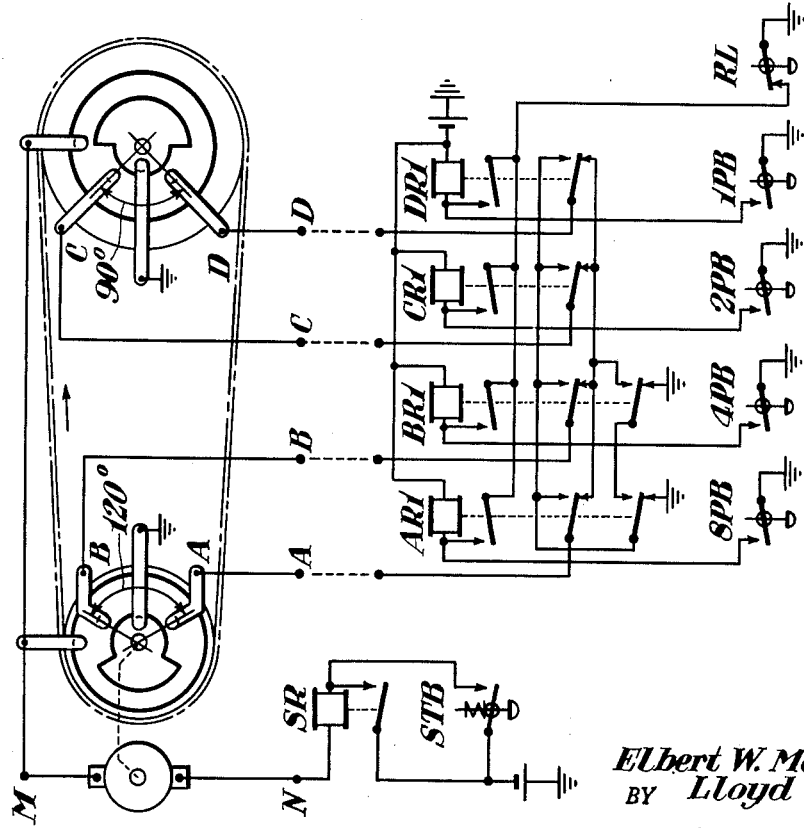
Fig. 3.
INVENTORS
*Elbert W. Marlowe and*
BY *Lloyd V. Lewis*
W. L. Stout
THEIR ATTORNEY Feb. 21, 1956  E. W. MARLOWE ET AL  2,736,017
DISPLAY INDICATOR AND CONTROL SYSTEM
Filed Jan. 24, 1952  7 Sheets-Sheet 3
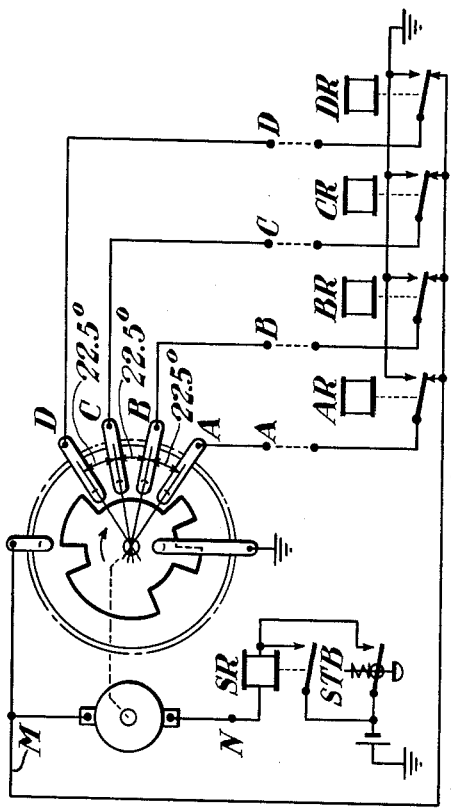
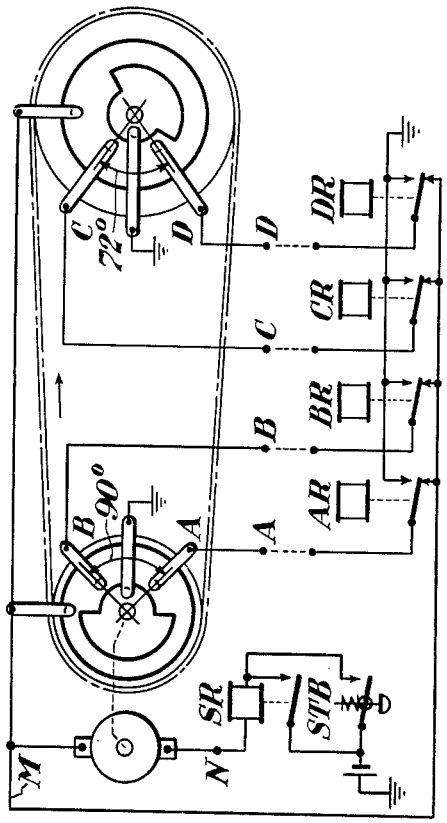
INVENTORS
Elbert W. Marlowe and
BY Lloyd V. Lewis
W. L. Stout
THEIR ATTORNEY INVENTORS
Elbert W. Marlowe and
Lloyd V. Lewis
BY W. L. Stout
THEIR ATTORNEY Feb. 21, 1956  E. W. MARLOWE ET AL  2,736,017
DISPLAY INDICATOR AND CONTROL SYSTEM
Filed Jan. 24, 1952  7 Sheets-Sheet 5
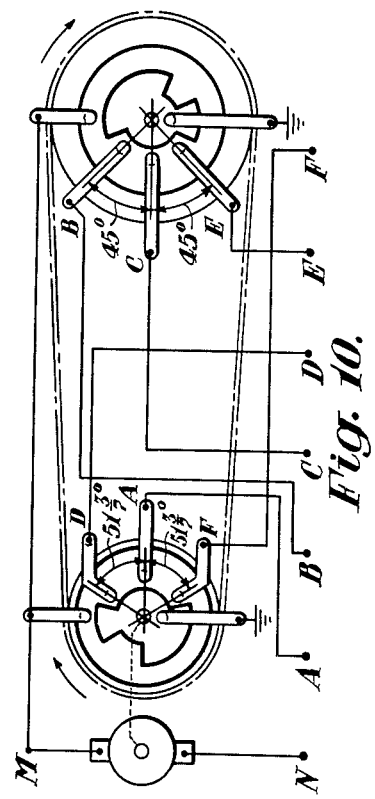
Fig. 12.
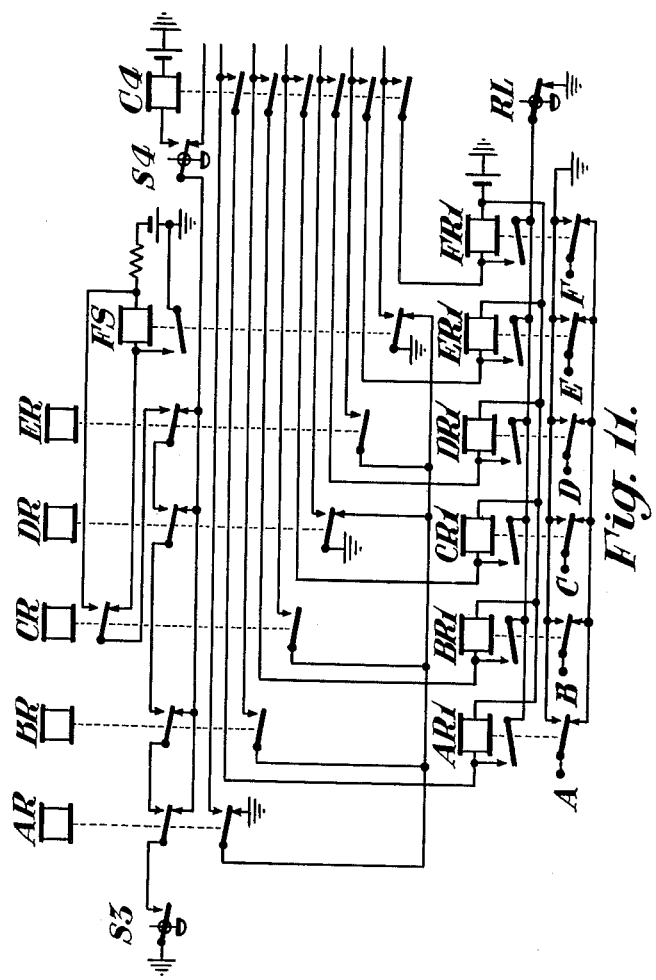
Fig. 11.
Fig. 10.
INVENTORS
Elbert W. Marlowe and
BY Lloyd V. Lewis
W. L. Stout
THEIR ATTORNEY

| POSITION | 72 POSITION BELT | | | | | | |
|---|---|---|---|---|---|---|---|
| | A | B | C | D | E | F | |
| 1 | 0 | 0 | 0 | 0 | 0 | 0 | |
| 2 | 0 | 0 | 1 | 0 | 0 | 1 | |
| 3 | 0 | 1 | 0 | 1 | 1 | 0 | |
| 4 | 1 | 0 | 1 | 0 | 0 | 1 | |
| 5 | 0 | 1 | 1 | 1 | 1 | 1 | |
| 6 | 1 | 1 | 1 | 1 | 1 | 0 | |
| 7 | 1 | 1 | 1 | 1 | 1 | 0 | |
| 8 | 0 | 0 | 0 | 0 | 0 | 0 | |
| 9 | 0 | 0 | 1 | 0 | 0 | 0 | |
| 10 | 0 | 0 | - | - | - | - | |
| -- | -- | -- | -- | -- | -- | -- | |
| 71 | 1 | 0 | 0 | 1 | 0 | 0 | |
| 72 | 1 | 1 | 0 | 0 | 0 | 0 | |
*Fig. 15.*
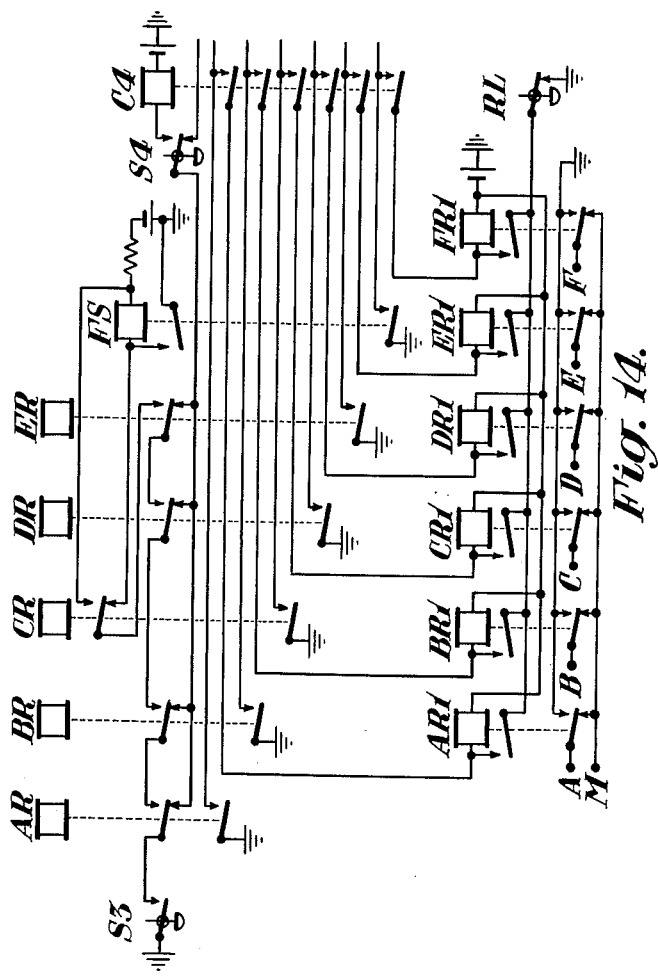
*Fig. 14.*
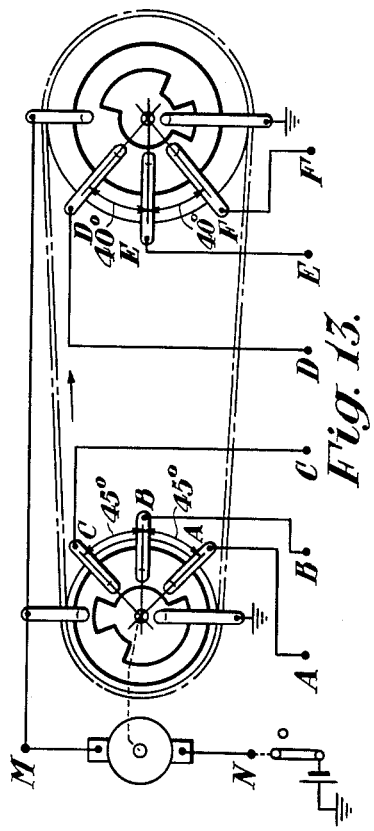
*Fig. 13.*
INVENTORS
*Elbert W. Marlowe and*
BY *Lloyd V. Lewis*
W. L. Stout
THEIR ATTORNEY

Feb. 21, 1956                E. W. MARLOWE ET AL                    2,736,017
                        DISPLAY INDICATOR AND CONTROL SYSTEM
Filed Jan. 24, 1952                                              7 Sheets-Sheet 7

| TELETYPE CODE | | | | | SYMBOL | | 56 POS. INDICATOR | | | | 72 POS. INDICATOR | | | |
|---|---|---|---|---|---|---|---|---|---|---|---|---|---|---|
| | | | | | | | F = 0 | | F = 1 | | F = 0 | | F = 1 | |
| A | B | C | D | E | LS | FS | POS. | SYM. | POS. | SYM. | POS. | SYM. | POS. | SYM. |
| 1 | 1 | 0 | 0 | 0 | A | — | 24 | A | 48 | ▭ | 55,63 | A | 47 | ↑ |
| 1 | 0 | 0 | 1 | 1 | B | ? | 26 | B | | | 16 | B | 24 | ⊕ |
| 0 | 1 | 1 | 1 | 0 | C | : | 23 | C | 39 | ▭ | 53 | C | 13 | ○ |
| 1 | 0 | 0 | 1 | 0 | D | $ | 33 | D | | | 8 | D | 40 | ↗ |
| 1 | 0 | 0 | 0 | 0 | E | 3 | 17 | E | 41 | 3 | 64,72 | E | 56 | 3 |
| 1 | 0 | 1 | 1 | 0 | F | ▭ | 19 | F | | | 44 | F | 4 | → |
| 0 | 1 | 0 | 1 | 1 | G | & | 44 | G | 4 | ▭ | 43 | G | 51 | ↘ |
| 0 | 0 | 1 | 0 | 1 | H | # | 29 | H | 21 | ▭ | 66 | H | 50 | ↓ |
| 0 | 1 | 1 | 0 | 0 | I | 8 | 15 | I | 7 | 8 | 37,45 | I | 29 | 8 |
| 1 | 1 | 0 | 1 | 0 | J | ▭ | 40 | J | | | 71 | J | 31 | ↙ |
| 1 | 1 | 1 | 1 | 0 | K | ( | 47 | K | | | 62 | K | 22 | ← |
| 0 | 1 | 0 | 0 | 1 | L | ) | 36 | L | 28 | ▭ | 3 | L | 59 | ↖ |
| 0 | 0 | 1 | 1 | 1 | M | . | 37 | M | 53 | ▭ | 34 | M | 42 | . |
| 0 | 0 | 1 | 1 | 0 | N | , | 51 | N | 11 | ▭ | 26 | N | 58 | ⊕ |
| 0 | 0 | 0 | 1 | 1 | O | 9 | 2 | O | 18 | 9 | 25 | O | 33 | 9 |
| 0 | 1 | 1 | 0 | 1 | P | 0 | 22 | P | 14 | 0 | 21 | P | 5 | ∅ |
| 1 | 1 | 1 | 0 | 1 | Q | 1 | 38 | Q | 6 | 1 | 30 | Q | 14 | 1 |
| 0 | 1 | 0 | 1 | 0 | R | 4 | 16 | R | 32 | 4 | 35 | R | 67 | 4 |
| 1 | 0 | 1 | 0 | 0 | S | ' | 3 | S | 27 | ▭ | 28,36 | S | 20 | ▭ |
| 0 | 0 | 0 | 0 | 1 | T | 5 | 50 | T | 42 | 5 | 57 | T | 41 | 5 |
| 1 | 1 | 1 | 0 | 0 | U | 7 | 31 | U | 55 | 7 | 46,54 | U | 38 | 7 |
| 0 | 1 | 1 | 1 | 1 | V | ; | 30 | V | 46 | ▭ | 61 | V | 69 | ⊕ |
| 1 | 1 | 0 | 0 | 1 | W | 2 | 52 | W | 20 | 2 | 39 | W | 23 | 2 |
| 1 | 0 | 1 | 1 | 1 | X | / | 5 | X | | | 52 | X | 60 | / |
| 1 | 0 | 1 | 0 | 1 | Y | 6 | 45 | Y | 13 | 6 | 12 | Y | 68 | 6 |
| 1 | 0 | 0 | 0 | 1 | Z | " | 10 | Z | 34 | ▭ | 48 | Z | 32 | + |
| 0 | 0 | 0 | 1 | 0 | CAR. RET. | | 9 | ▭ | 25 | ⊞ | 17 | ▭ | 49 | ▭ |
| 0 | 1 | 0 | 0 | 0 | LINE FEED | | 8 | ▭ | 56 | ▭ | 19,27 | ▭ | 11 | ▭ |
| 1 | 1 | 1 | 1 | 1 | LTR. SHIFT | | 54 | ▭ | | | 70 | ▭ | 6 | ▭ |
| 1 | 1 | 0 | 1 | 1 | FIG. SHIFT | | 12 | ▭ | | | 7 | ▭ | 15 | ▭ |
| 0 | 0 | 1 | 0 | 0 | SPACE | | 43 | ▭ | 35 | ▭ | 10,18 | ▭ | 2 | ▭ |
| 0 | 0 | 0 | 0 | 0 | BLANK | | 1 | ▭ | 49 | ▭ | 1,9 | ▭ | 65 | ▭ |

*Fig. 16.*

INVENTORS
*Elbert W. Marlowe and*
BY *Lloyd V. Lewis*

W. L. Stout
*THEIR ATTORNEY*

United States Patent Office 2,736,017
Patented Feb. 21, 1956

2,736,017

DISPLAY INDICATOR AND CONTROL SYSTEM

Elbert W. Marlowe, Penn Township, Allegheny County, and Lloyd V. Lewis, Pittsburgh, Pa., assignors to Westinghouse Air Brake Company, Wilmerding, Pa., a corporation of Pennsylvania Application January 24, 1952, Serial No. 268,022

11 Claims. (Cl. 340—316)

This invention relates to remotely controlled display indicators and to an improved control system for such indicators. More particularly, our invention comprises an improved form of indicator mechanism of simple and novel construction which is particularly adapted for use in a display panel containing large numbers of indicators arranged in closely spaced rows and columns, and also comprises a novel remote control system for operating such indicators by binary code signals employing a relatively small number of control wires, and for electrically indicating the positions of the indicators over the same wires.

The apparatus of our invention is particularly adapted for use in aircraft control systems for registering the identification and the course of aircraft, or other data relating thereto, or for the display of weather data or other information received from distant points and supplied to the indicator system of our invention in the form of teletype code signals. Furthermore, a received message displayed by a series of indicators may be revised or corrected locally if necessary and may then be retransmitted to a distant point by means of conventional teletype apparatus.

The display indicator which we employ in the system of our invention is preferably of the type disclosed and claimed in a copending application for Letters Patent of the United States, filed by Elbert W. Marlowe on even date herewith. One feature of our invention is the provision of an improved indicator of this type which is adapted to display a larger number of symbols without increasing the number of control wires.

The display indicator of the type referred to is characterized by the fact that the symbols are arranged in spaces on the face of a belt mounted on two sprocket wheels of slightly different size, one in the rear of the other, with their axes parallel to the panel. The surface of the wheels upon which the belt travels is made equal to different integral numbers of belt spaces and the total number of belt spaces equals the product of the numbers of spaces on the two wheels, these numbers being so chosen that the wheels have a characteristic relative position for each different belt position.

The movable member of the indicator comprising the belt and the two wheels is operable from one selectable position to another by a motor, which may be set into operation by supplying energy to one or more of a group of control wires in different binary code combinations, and then closing a contact in the motor circuit. The control wires are connected individually to different circuit controllers, some of which are actuated by one wheel and the remainder by the other, each such circuit controller being arranged so that it either closes or opens a branch of the motor circuit in each wheel position. The circuit controllers cooperate in such a manner that the motor circuit is opened only when the belt is in a position to display the symbol identified by the code signal supplied to the control wires.

In accordance with a feature of the invention, a stick relay is provided which opens a contact in the motor circuit when the movable member reaches a selected position. Each circuit controller is arranged to supply energy to its control wires when it occupies the position where its connection to the motor circuit is open, so that when the indicator is at rest, the control wires are energized selectively in a code pattern which identifies the position to which the indicator has been operated. By this means the position of the indicator may be ascertained at a remote point without operating it, by connecting lamps or relays, for example, to the control wires.

In addition, this feature enables each indicator to serve as a transmitter as well as a receiver of data. A symbol displayed by one indicator may be transferred to a second indicator by connecting its control terminals to the control terminals of the second indicator and then pressing a button to complete the motor circuit for the second indicator.

Several forms of indicator mechanism and control circuits therefor will now be described in connection with the accompanying drawings, in which Fig. 1A comprises a side view of one form of display indicator of the form shown in the above-mentioned Marlowe application, having twelve display positions.

Fig. 2 is a chart containing a list of four-unit binary code signals for operating the indicator of Fig. 1A to its different positions together with a list of symbols that may be displayed.

Fig. 3 is a circuit plan showing an improved control system for the indicator of Fig. 1A, in which the control wires are connected to contacts of a set of relays so as to register the code signals listed in Fig. 2, and no others.

Fig. 4 shows circuits for a set of indication relays which when connected to the control terminals of the indicator of Fig. 3 will display corresponding symbols.

Fig. 5 is a circuit plan for a second form of indicator embodying our invention in which the symbols are displayed on the surface of a wheel having sixteen selectable positions.

Fig. 6 is a chart containing a list of four-unit binary code signals for operating the indicator of Fig. 5.

Fig. 7 is a circuit plan for a third form of indicator embodying our invention which is also controllable by four-unit binary code signals but which has twenty display positions.

Fig. 8 is a chart containing a list of four-unit binary code signals for operating the indicator of Fig. 7.

Fig. 10 is a circuit plan for an indicator of the form shown in Figs. 1A and 3 arranged for control by six-unit binary code signals and having fifty-six display positions.

Fig. 11 shows circuits for a translator for converting five-unit teletype code signals to six-unit code signals for controlling the indicator of Fig. 10.

Fig. 12 is a chart containing a list of code signals for operating the indicator of Fig. 10.

Fig. 13 is a circuit plan for an indicator of the form shown in Fig. 7 arranged for control by six-unit binary code signals and having seventy-two display positions.

Fig. 14 is a circuit plan for a translator, analogous to that of Fig. 11, for controlling the indicator of Fig. 13.

Fig. 15 is a chart containing a list of code signals for operating the indicator of Fig. 13.

Fig. 16 is a chart containing a list of standard five-unit teletype code signals and symbols, together with lists of the positions to which the indicators of Figs. 10 and 13 are operated by such signals to display the corresponding symbols.

Similar reference characters refer to similar parts in each of the several views.

Figure 1C:
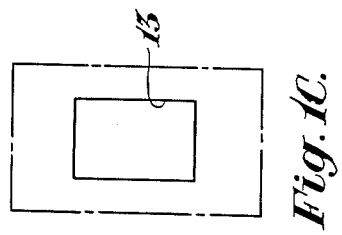
Figs. 1B and 1C show a top view and front view of the indicator of Fig. 1A.
Figure 1B:
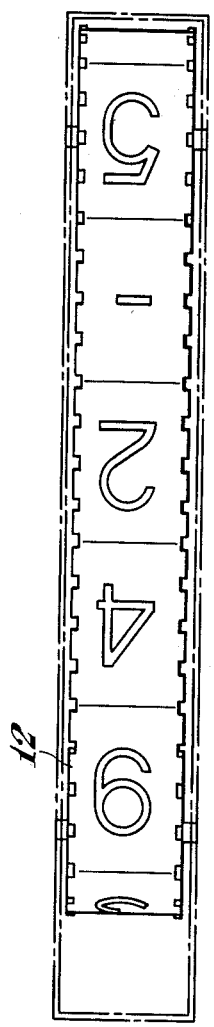
Figure 1A:
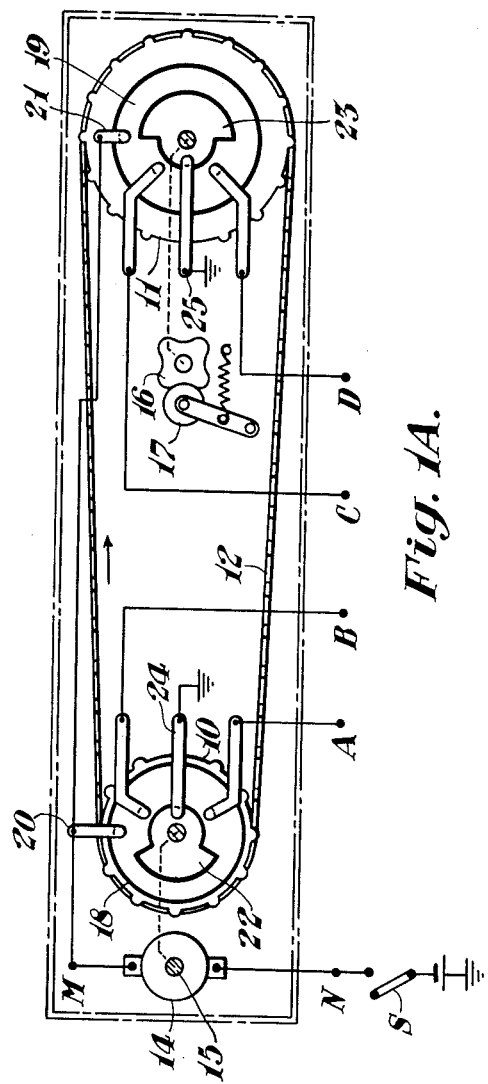

Referring to Figs. 1A, 1B and 1C of the accompanying drawings which illustrate the mechanical construction, it will be seen that in the form shown in these views, the movable member comprises two sprocket wheels 10 and 11 connected by a belt or ribbon 12, the edges of which are notched to engage sprocket teeth on the wheels. As shown more particularly in Fig. 1B, the belt is marked by transverse lines which define twelve symbol spaces of equal length. When the belt is rotated, the symbols are brought one at a time into a display position in a window 13, shown in Fig. 1C, in the face of the indicator housing. The circumference of wheel 10 is made equal to three belt spaces and that of wheel 11 is made equal to four belt spaces, so that as the belt is rotated through its twelve positions, each of the three positions of one wheel comes into alignment once with each of the four positions of the other wheel.

The wheels and belt may be rotated from one position to another by any suitable form of motive power controllable by an electric circuit. The motor circuit as shown, for example, includes a motor 14 which alternatively may be a clutch magnet by which the rear wheel may be coupled to a rotating shaft 15 which may serve as a prime mover for a group of indicators. The front wheel carries a suitable positioning device which may comprise a cam 16 and a spring pressed roller 17, shown separately for clearness, for maintaining a selected belt space in alignment with the window 13 when the motor circuit is open.

Each wheel carries two circuit controllers which may be of any suitable type. They may consist of cams, for example, which actuate transfer contacts of the relay type, but preferably they are combined, as shown, in the form of a wafer switch or disc commutator having inner and outer collector rings, with the outer ring, at least, insulated from the inner ring and from the wheel upon which the rings are mounted. The outer rings, 18 and 19, are connected by brushes 20 and 21 to terminal M of motor 14, the other terminal N of which is connected through a normally open circuit controller, such as the switch S, to the negative or common return terminal of a source of energy. The inner rings, 22 and 23, are connected by brushes 24 and 25 to the positive or supply terminal of the source.

As shown, the positive supply terminal is grounded, but it is to be understood that where a connection to ground is mentioned herein it refers to a connection to the supply terminal of the local source of energy and not necessarily to a connection to earth.

The commutator on wheel 10 has two distributor brushes spaced 120° apart connected to two control wires A and B, and the commutator on wheel 11 has two similar brushes spaced 90° apart connected to two other control wires C and D. Designating the position in which the indicator is shown in Fig. 1A as position 1, and assuming clockwise rotation, the distributor brushes connect wires A, B, C and D alternately to the outer and inner rings in the order listed in Fig. 2. In this chart, and in the other charts shown herein, in the numbers in binary notation which designate code combinations, the value "0" indicates a connection to the corresponding outer ring, and the value "1" indicates a connection to the inner ring. Since the circuit for the outer ring is normally open and the inner ring is grounded, the values "0" and "1" designate the deenergized or open condition, and the energized or grounded condition, respectively, of the control wires A, B, C, and D. These values are also used herein to designate the released and operated condition, respectively, of the relays shown herein which govern or are responsive to the energization of these control wires, and they correspond respectively to the spacing and marking characters of the code elements.

The third column in Fig. 2 contains a list of typical symbols which may be displayed by the indicator of Fig. 1A in its different positions. As shown, the indicator in this form is primarily for the display of decimal digits, but it is to be understood that all twelve spaces are available for the display of symbols.

The indicator of Fig. 1A may be operated to any one of its twelve positions by connecting its four control wires A, B, C and D to a suitable set of circuit controllers arranged to form one of the four-unit binary code signals listed in Fig. 2, and then closing a contact in the motor circuit, such as the switch S.

In order to enable the operating circuits for the indicator of Fig. 1A to be more readily traced, they have been reproduced in Fig. 3, where the control wires A, B, C and D of the indicator are shown connected to a bank of four relays AR1, BR1, CR1 and DR1, which may be set up to represent different binary code signals by the operation of push buttons as shown, or by other means, such as by scanning a perforated tape, for example.

It is to be noted that the relay contacts connected to the wires A, B, C and D are functionally equivalent to the circuit controllers actuated by the indicator wheels. It follows that the indicator may also be operated by connecting its control wires to the corresponding control wires of another similar indicator. In other words, when the switch in the motor circuit is closed, the indicator is conditioned to serve as a receiver, and when this switch is open, the indicator is conditioned to serve as a transmitter of binary code signals.

As shown in Fig. 3, when the relays are all deenergized corresponding to the signal 0000, for position 1 of the indicator, the control wires are all disconnected from ground at the relay end of their circuits but are connected together over the back contacts of the relays. This is also the case when the relays have been operated by code signals for which $AB=11$, which do not appear in the chart of Fig. 2.

When the relays have been operated in accordance with one of the code signals in Fig. 2, which identifies one of the positions 2 through 12, one or more of the control wires A, B, C or D are connected over front contacts of the corresponding relays AR1, BR1, CR1 or DR1 to ground at a back contact of relay AR1 or BR1.

The circuits of Fig. 3 function in the following manner:

Assuming first that the indicator is in one of its positions 2 to 12, but that the relays are deenergized, as shown, in accordance with the signal 0000 for position 1. It will be seen from the drawing that the back contacts of the relays provide a connection over at least one control wire to an outer ring connected to the motor terminal M, as indicated by the value "0" in the chart, in each of the positions 2 to 12. It will also be seen that these back contacts are connected to ground over at least one control wire which is grounded at the indicator end, as indicated by the binary value "1" in the chart. Terminal M is therefore grounded in each of the positions 2 through 12, so that, on operating the starting button STB, the motor circuit is completed from terminal M through the motor and a series relay SR, and a source of energy to ground. Relay SR operates and closes a contact which maintains the motor in operation until position 1 is reached, where the relative positions of the circuit controllers are the same as that of the relay contacts. In this position the circuit controllers disconnect ground from the motor circuit and relay SR releases.

Assuming next that one of the control relays of Fig. 3 is energized, relay BR1, for example, so that the relay positions correspond to the code 0100 for position 5; wire B is grounded at the relay end, over a front contact of relay BR1 and the lower back contact of relay AR1. This grounds the motor terminal M in each of the indicator positions except 2, 5, 8 and 11. In these positions, terminal M is connected over wire A to the back contacts of the relays, which are grounded by the movable member of the indicator over wire C in positions 8 and 11 and over wire D in positions 2 and 11, as indicated in Fig. 2. Consequently, if the motor circuit is closed by pressing the button STB, it will open to stop the indicator when the movable member arrives at position 5.

If any two of the control relays are energized, the operations are similar. If, for example, relays BR1 and DR1 are energized, the grounding of wires B and D at the relay end grounds the motor terminal M in each position except 2 and 11. In position 11 terminal M is connected over wire A and the back contacts of the relays to wire C which is grounded at the indicator end. Consequently, the movable member will stop only in position 2.

If three control relays are energized, there will be three control wires grounded at the relay end, B, C and D, for example, and the motor terminal M is grounded by one or more of these three wires in all positions except one, position 11 in this instance.

From the foregoing it will be clear that when one or more of the control relays is energized, the movable member of the indicator is operated through certain positions by energy supplied over the control wires at the point of control, and through other positions by energy supplied to the control wires at the indicator end. When all but one of the control wires are grounded at the point of control, this is of itself sufficient to move the indicator to the required position.

It will be seen that when the indicator stops in a selected position, each control wire which is grounded at the point of control is also grounded at the indicator end, and upon disconnecting the control means the indicator terminals remain grounded or ungrounded in accordance with the code signal for the selected position.

The indicator position may be verified by connecting the windings of the bank of relays of Fig. 4 to the indicator terminals A, B, C and D. This bank comprises four relays AR2, BR2, CR2 and DR2 having contacts which control a bank of lamps for displaying different symbols. The lamp circuits are so arranged that when the relays of Fig. 4 are supplied one of the code signals of Fig. 2, the lamp which becomes lighted is the one which displays the corresponding symbol.

For example, it has been explained in connection with Fig. 3 that when relay BR1 is energized the indicator may be operated by the corresponding signal 0100 to position 5 where the decimal digit 4 is displayed, and if relays CR1 and DR1 are also energized, by signal 0111 to position 11 where the digit 7 is displayed. When the indicator control wires are connected to the relays of Fig. 4, if the code signal is 0100, relay BR2 is operated to light the lamp carrying the symbol 4, and if the code signal is 0111, relays BR2, CR2 and DR2 are operated to light the lamp for symbol 7, as will be readily apparent from the drawing.

The position selecting system of the present invention is not limited to the control of circuit controllers on two wheels as described in the foregoing, but may be modified to adapt it to the control of a single wheel. In a modification which will now be described, the selecting system may be arranged for the selection of all of the $N=2^n$ binary code combinations, where N equals the number of selectable position and $n$ equals the number of code elements. This is accomplished by permanently connecting the motor terminal M to a corresponding terminal at the point of control, by a wire which will be identified as wire M.

This arrangement is shown in Fig. 5, where the distributor brushes connected to the control wires A, B, C and D are spaced 22.5 degrees apart on a commutator carried by a motor-driven wheel which differs from those already described in that the commutator has 16 selecting positions in which the brushes engage the outer and inner rings in accordance with the code signals listed in Fig. 6, by means of which the wheel may be stopped in any one of sixteen selectable positions, in each of which a symbol identified by the corresponding code signal may be displayed.

It is to be understood that the control relays AR, BR, CR and DR of Fig. 5 may be controlled like the relays of Fig. 3, or otherwise, and that they may be arranged in any of the sixteen combinations listed in Fig. 6. The circuits of Fig. 5 differ from those of Fig. 3 in that the relay contacts are arranged to supply all sixteen code signals to the control wires, and in the provision of a permanent connection from the motor terminal M to the back contacts of the control relays. It will be seen that in Fig. 5 the upper motor terminal may be grounded over wire M and a relay back contact which has its wire A, B, C or D connected to ground at the inner ring of the commutator, in each of the positions except position 1, and may also be grounded over a relay front contact which has its wire A, B, C or D connected to the outer ring of the commutator, in each of the positions except position 8. The motor circuit is opened to stop the movable member in a position where each circuit controller and the relay contact to which it is connected over wire A, B, C or D assume a corresponding position. It follows that for each signal element which has the value "0," the contacts at both ends of the corresponding control wire are connected to the motor wire M and the control wire consequently is disconnected from ground. For each signal element which has the value "1" the control wire is disconnected from the motor circuit and is grounded at both ends.

Assuming that relays AR through DR in Fig. 5 are all energized to supply the signal 1111, which is not one of the signals that is selectable by the indicator of Figs. 1A and 3, it will be seen that, in Fig. 5, the indicator will be operated to position 8 where all of the control wires are grounded. When the indicator is in position 8, if one or more of the relays are released to supply a different signal to the indicator, the closing of the relay back contacts extends the ground to terminal M to enable the movable member to be moved away from position 8 when button STB is operated.

Assuming that relay BR of Fig. 5 is energized, corresponding to the code signal 0100 for position 15 in Fig. 6, the motor circuit is grounded over the front contact of relay BR in each of the eight positions for which $B=0$, while in each of the remaining positions except position 15, the motor circuit is grounded over a back contact of relay AR, CR or DR as indicated by the value "1" under A, C and D in Fig. 6, and consequently the movable member will stop in the selected position 15.

It will be evident that in Fig. 5, the four control wires form independent parallel branches in the motor circuit and that the opening of each branch indicates agreement between an element of the code signal which identifies the position of the indicator and the corresponding element of the code signal supplied at the point of control.

The modified selecting system of Fig. 5 which has just been described may also be used for the operation of an indicator of the two-wheel type analogous to the one already described, as will now be pointed out in connection with Figs. 7 and 8.

The indicator of Fig. 7 differs from the one shown in Figs. 1A and 3 in that the wheels have four and five positions and their circumferences are equal to four and five belt spaces, respectively, while the belt has twenty symbol spaces. The distributor brushes connected to wires A and B are displaced 90° so as to provide four selecting positions, while those connected to wires C and D are displaced 72° and provide five selecting positions of which the fifth is the same as the first, as shown by the chart, and although the belt has twenty selectable spaces, four of these are duplicates of four others. In Fig. 8, there are sixteen different symbols corresponding to the sixteen code combinations of the four-unit binary code, these symbols as shown comprising the decimal digits 1 through 9, zero, the letters A, B, C, D and E, and a space or blank.

It will be seen that the code signals listed in Fig. 8 are the same as those of Fig. 6, although arranged in a different order. The circuits of Fig. 7 are similar to those of Fig. 5 already described, and function in the same manner, the indicator of Fig. 7 being likewise arranged to display symbols corresponding to each of the sixteen signals of the four-unit binary code.

Figure 9:
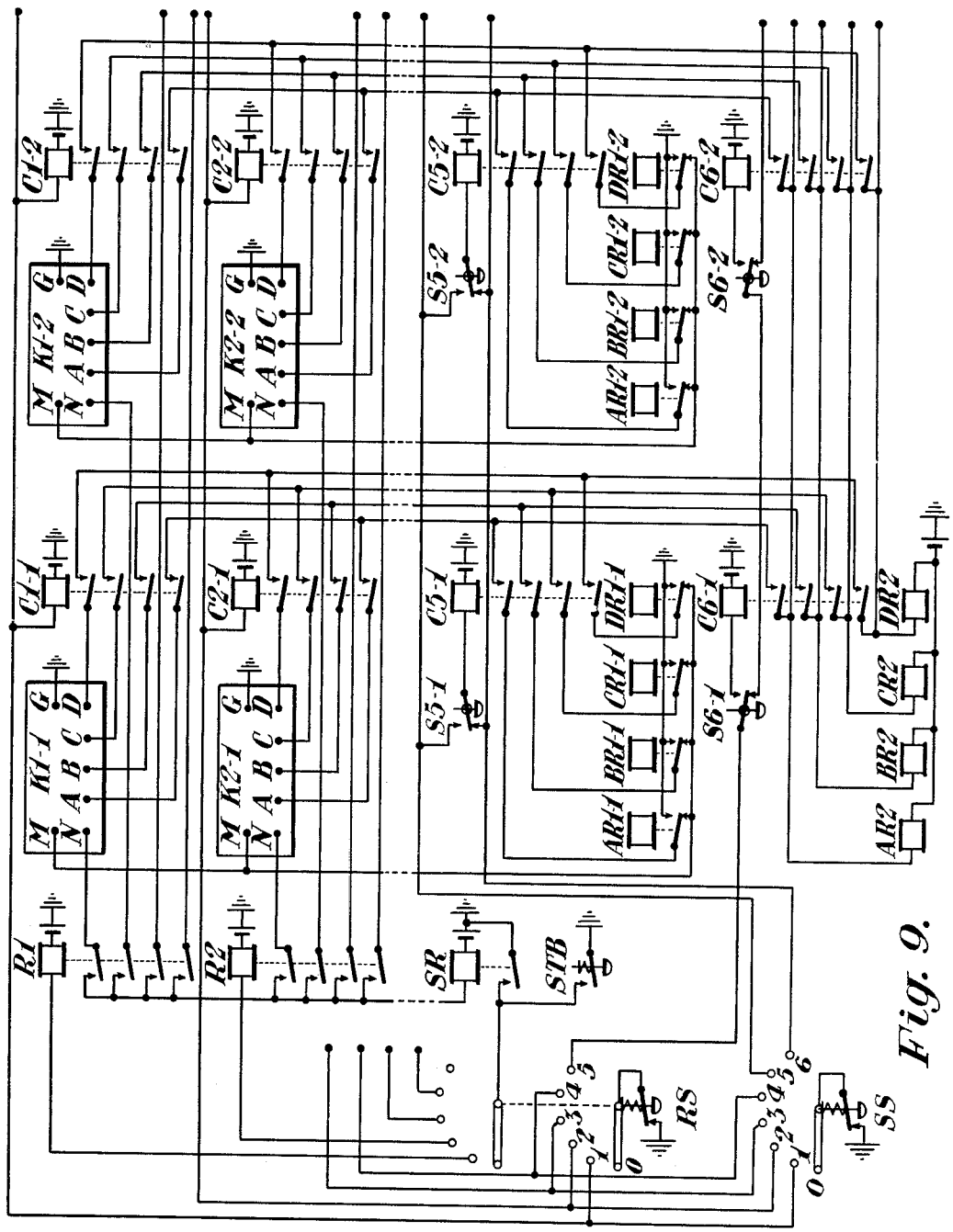
Fig. 9 is a circuit plan showing typical portions of the circuits for a display panel containing a plurality of indicators of our invention.

Referring now to Fig. 9, it is to be understood that a plurality of indicators of any one of the forms herein described may be assembled in a display panel and interconnected in the manner shown. It is also to be understood that all indicators which are in the same vertical column should be of the same type, or at least, should employ the same code signals. In Fig. 9, the indicators are identified by the reference character K, and to simplify the drawing, only two indicators K1-1 and K1-2 in a first row and two corresponding indicators K2-1 and K2-2 in a second row are shown, the number in each row in practice being made sufficient for the display of the data desired, which may consist of a series of numbers for example. Each indicator has a connector relay C1-1, C1-2, etc. by which its terminals A, B, C and D may be connected to a set of vertical bus wires which provide access over contacts of other connector relays C2-1, C2-2, etc. to the corresponding terminals of the indicator in the same column in each other row. Other connector relays such as C5-1, C5-2, etc. enable the vertical bus wires to be connected to the contacts of banks of control relays AR1-1 etc. which serve as described in connection with the relays of Fig. 3 as a means for supplying data to a row of indicators or for changing such data.

These relay banks may be controlled by push buttons or by code signals recorded in a teletype tape, for example.

An additional series of connector relays C6-1, C6-2, etc. enables the different groups of bus wires to be connected successively, by the operation of switches S6-1, S6-2, etc. to a bank of indication relays AR2, etc., already described in connection with Fig. 4.

Each row of indicators in Fig. 9 is provided with a control relay R1, R2, etc. for completing the motor circuits to enable all the indicators in a selected row to be operated concurrently.

The control means, as shown diagrammatically in Fig. 9, comprises a single rotary sending switch SS, a double rotary receiving switch RS, a starting button STB and a stick relay SR. The rotary switches may be of any suitable type operable manually or automatically, but as shown they are of the "push-turn" type having a control knob which must be pressed to enable the movable member to be rotated to select a circuit, and must be released to complete the circuit selected.

The operation of the control system of Fig. 9 under different assumed conditions will now be described. It will be assumed first that a code message is stored in the series of relay groups of control relays AR1-1 through DR1-1, AR1-2 through DR1-2, etc., and that it is desired to have this message displayed by the indicators K1-1, K1-2, etc., of the first row. To effect this operation, the sending switch SS is placed in position 6 to operate all of the connector relays C5, and then the receiving switch RS is placed in position 1 to operate all of the connector relays C1. The operated connector relays connect the control terminals A, B, C and D of each indicator in the first row over the vertical bus wires to the contacts of the associated control relays to establish circuits such as those shown in Fig. 3, 5 or 7, the mode of operation of which has already been described. The starting button STB is then pressed momentarily, grounding the upper arm of switch RS and thereby completing a circuit for the control relay R1, which operates and its contacts connect the motor terminal N of each indicator in the first row through relay SR to the negative terminal of the source, thereby completing the motor circuits and causing each of these indicators to assume the position designated by the code signal supplied to its control wires by the corresponding bank of control relays in the manner already explained. Relay SR operates and its contact grounds the upper contact arm of switch RS so that relay R1 is maintained energized independently of button STB, until each indicator completes its operation.

When the sending switch SS is in position 6, as above described, all of the indicators selected by switch RS are operated concurrently. Alternatively, one or more of the selected indicators may be operated individually, to rectify errors or to change a portion of the message, for example. For this purpose, switch SS is placed in position 5, and the connector relays C5 are operated individually by means of the push buttons S5-1, S5-2, etc., as desired. To operate the corresponding indicators in the first row, switch RS is placed in position 1 and button STB is pressed to operate relay R1 as in the preceding example. In this case, although a connection to the negative terminal of the source is made to terminal N of each indicator of the selected row, the motor circuits for the indicators in non-selected columns remain open. This is for the reason that the motor circuit is closed only when each control wire which is connected to the motor circuit within the indicator is either grounded at some other point or is connected externally to a control wire which is grounded within the indicator.

When the connector relays for a row of indicators are operated, each indicator in the row which is in any position except the one corresponding to the blank signal 0000, grounds the corresponding set of vertical bus wires in a code pattern which identifies its position. Assuming, for example, that switch SS is placed in position 1, the sets of bus wires will be energized by the operation of relays C1-1, C1-2, etc., according to the positions of the indicators in the first row. If switch RS is then placed in position 2, the operation of relays C2-1, C2-2, etc. will apply additional grounds to the bus wires from the indicators of the second row which are in non-corresponding positions. In this case, relay R2 and not R1 is operated when button STB is pressed, completing the motor circuits for the indicators in the second row only, with the result that each indicator in the second row will assume the same position as the corresponding indicator in the first row, removing the conflict which results when different code signals are supplied to the same set of wires.

It will be evident from the foregoing that a message stored in a row of indicators may be transferred in its entirety to another row of indicators in the time required for the operation of a single indicator.

It will also be evident from the foregoing that each indicator is adapted to serve as a transmitter of binary code signals when the connection to terminal N is open, and as a receiver of such signals when this connection is closed, and further that the indicator of our invention in each of the forms shown is adapted to indicate its position in two ways, by the display of a symbol, and by maintaining a ground on its control wires in a code pattern corresponding to the code signal by which the indicator was last operated. The indicator is therefore adapted to indicate its position at a remote point by the operation of a set of relays, as well as by the operation of another indicator as above described. Assume, for example, that switch SS is placed in position 1 to energize the vertical bus wires in accordance with the message displayed by the indicators in the first row as above described, and that switch RS is then placed in position 5. By closing switch S6-1, a connector relay C6-1 may be operated to connect a bank of relays AR2 through DR2 to the control terminals of indicator K1-1. Assuming this indicator to be one employing the codes listed in Fig. 2, these relays may be arranged as shown in Fig. 4 where they are shown controlling a series of lamps which display the same indications as already described.

As shown in Fig. 9, the same set of relays may be connected to each set of bus wires in turn by the operation of a series of switches S6-1, S6-2, etc. It is to be understood that these switches may be replaced, in practice, by an automatic stepping switch, and also that the group of relays AR2, etc. are capable of controlling standard apparatus for recording messages on a perforated tape for transmission over a line circuit to a distant point.

Two further modifications of the indicator system of our invention which are capable of displaying larger numbers of symbols will now be described. These indicators are governed by six-unit binary signals, so arranged that five of the units, designated A, B, C, D and E, correspond to the elements of the standard five-unit teletype code, while the sixth, designated F, is governed by the letter and figure-shift characters of the standard teletype code for the purpose of selecting between two symbols identified by the same five-unit signal.

Referring to Fig. 10, the indicator there shown is analogous to the first form shown in Figs. 1A and 3. The rear wheel has a circumference equal to seven belt spaces, and has a seven-position commutator with three distributor brushes spaced one-seventh of a revolution apart connected to wires F, A and D, while the front wheel has a circumference equal to eight belt spaces, with an eight position commutator with three brushes spaced one-eighth of a revolution apart connected to wires B, C and E.

In general, in this form of indicator, if $n$ designates the number of control wires for each wheel, the number of wheel positions is $N=2^n$ when all the combinations are used. In Fig. 10 the front wheel has N positions and the rear wheel one less, and the number of belt positions is $N(N-1)$; in this case fifty-six, all of which are selectable.

This formula is also applicable to the indicator of Figs. 1A and 3. For the indicator of Fig. 5, the number of display positions is $N^2$, while for the indicator of Fig. 7, and also for the one shown in Fig. 13, hereinafter described, it is $N(N+1)$.

In Fig. 10, as in the preceding examples, the indicator as shown is in position 1, corresponding to the blank signal, and as the wheels rotate clockwise they pass through 56 different relative positions, each identified by a six-unit binary code signal as indicated by the chart of Fig. 12. In referring to this chart, it will be understood that the signals FAD for positions 1 to 7 are repeated eight times, and the signals BCE for positions 1 to 8 are repeated seven times during the movement of the belt from position 1 to position 56.

One manner in which indicators of this type may be used to display a teletype message will be made clear by reference to the chart of Fig. 16, where in the first three columns, the five-unit telegraph signals are listed for all characters or symbols found on a standard teletype keyboard for both the letter-shift and figure-shift positions.

It is to be understood that the indicator of Fig. 10 is intended primarily for the display of the 26 letters of the alphabet and of the ten decimal digits, and that the various punctuation marks are generally not needed. The symbols may be assigned to the different belt positions of the 56-position indicator in the order indicated in Fig. 16, where it will be seen that of the 64 possible signals, those which are not selectable are the eight for which the elements $FAD=111$. This combination is one which does not appear in the code signal for any of the decimal digits and consequently all of these are selectable, and in addition, fourteen other figure-shift positions are selectable, but have no symbols assigned thereto and are represented by blanks in Fig. 16. Each of the numbers listed under "Pos." in the chart for the 56-position indicator designates one of the belt positions listed in Fig. 12. For example, the signal $FADBCE=010010$ for position 3 in Fig. 12 corresponds to the teletype signal $ABCDE=10100$ for the letter-shift position, $F=0$, and is the signal for the symbol S which appears in position 3.

One manner of translating the conventional five-unit binary code to a six-unit code for the control of the indicator of Fig. 10 is shown diagrammatically in Fig. 11. In this view it is to be understood that the teletype signals are supplied by a tape or keyboard to five receiving relays AR through ER, and are delivered to the indicator system by a group of six control relays AR1 through FR1, controlled by a switch S3. If the received signal is the figure-shift signal 11011, relays AR, BR, DR and ER are energized, and the closing of switch S3 operates a stick relay FS, which remains energized until switch S3 is operated following the reception of a letter-shift signal 11111, the result of which is to short-circuit the winding of relay FS over a front contact of relay CR so that relay FS becomes deenergized and releases. On reception of any signal except the two mentioned, the operation of switch S3 completes a circuit over a back contact of one of the receiving relays and a selector switch such as S4, for a connector relay C4. If the signal is one which is selectable by the indicator of Fig. 10, the operation of relay C4 serves to transfer the received signal, with the addition of a sixth element which reflects the position of relay FS, to the group of six relays AR1 through FR1, the contacts of which are connected to the indicator control wires A through F. These relays may be arranged to operate the indicator to the position identified by the code signal in the manner already described in connection with Figs. 3 and 9. It will be readily apparent that the control system of Fig. 9 may be readily adapted without change in principle to the indicators having six control wires.

The indicator of Fig. 10 is provided with a belt having 56 selectable positions. Since the indicator is controlled by a six-unit code source as indicated, the number of selectable positions may be $2^n$ or 64 if the wire M were included for the motor circuit as illustrated in Figs. 5 and 7, or the number may be $2^n-1$ or 63 positions if the wire M is omitted as in Figs. 3 and 11. As previously stated, the nonselectable signals for the indicator of Fig. 10 are those for which the elements $FAD=111$. If any of these signals were to be supplied to the indicator, the motor circuit of the indicator would remain energized and the indicator would continue running with no position in which it may stop. Thus in converting from a five-unit code to a six-unit code, the transmittal in error of a nonselectable signal wherein $FAD=111$ for an indicator as illustrated in Fig. 10 having only 56 selectable positions must be corrected or translated into a six-unit code signal wherein the $FAD=111$ combination is avoided.

To this end, the receiving relays AR, BR, etc., and the figure shift or stick relay FS is provided with a second set of contacts, the front contacts when engaged by their respective switch arms completing energizing circuits for their associated relays AR1, BR1, etc., and FR1, respectively. The relay AR is provided with a grounded back contact to ground a common lead for the switch arms of relays CR and ER and for the back contacts of relays DR and FS, while the switch arms of relays DR and FS are grounded for grounding the same common lead.

When a nonselectable code including the elements $FAD=111$ is received, relays AR and DR are operated, and with relay FS energized, ground is disconnected from the common lead and applied to the front contacts of the relays FS, AR, and DR. With the connector relay C4 energized, relay AR operates relay AR1, relay DR operates relay DR1, and relay FS operates relay FR1. Energization of relays BR, CR or ER by a signal including the elements $FAD=111$ will not operate their respective relays BR1, CR1 or ER1 since the ground connection has been removed from the common lead to which the lower switch arms of the receiving relays are connected. Thus upon receipt of any five-unit code signal by the receiving relays AR, BR, etc., having elements $FAD=111$, the signal is converted to the selectable six-unit code signal wherein elements $ABCDEF=000101$. As indicated in Fig. 16 in the column for the 56-position indicator of Fig. 10 and wherein $F=1$, this signal will operate the indicator to position 25 where a blank is displayed. This blank may, for example, have a distinctive color, such as red, to indicate the error condition.

While we have illustrated the translating circuit of Fig. 11 for converting five-unit code to six-unit code in connection with the indicator of Fig. 10 wherein the greatest possible number of selectable positions is $2^n-1$ or 63 positions, it will be readily apparent from a consideration of Figs. 10 and 11 that an extension of the lowermost common lead for the back contacts engaged by the switch arms connected to terminals A, B, C, etc. of Fig. 11 to the motor terminal of Fig. 10 will provide the control wire M previously described to provide an indicator having $2^n$ or 64 possible selectable positions.

For certain applications of the indicator of our invention a larger number of teletype symbols are required than can be conveniently supplied by the mechanism of Fig. 10. One example is in connection with teletype networks used primarily for the transmission of weather data in which case it is the practice to equip the keyboards and printers with special weather symbols such as are listed in the last column at the right in Fig. 16.

These may be provided for by the modification shown in Fig. 13, the motor circuit of the indicator including the wire M as in Fig. 7 already described, the indicator being adapted to provide symbol positions for all 64 signals of a six-unit code.

In the form shown in Fig. 13, the front wheel has a circumference equal to nine belt spaces, and has a nine-position commutator with three brushes spaced 40° apart, while the rear wheel is similar to the front wheel in Fig. 10, with eight spaces and three brushes spaced 45° apart. The belt has 72 spaces to which code signals are assigned as indicated in the chart of Fig. 15, each of which is selectable and may be used for the display of a symbol, as indicated in the table of symbols for the 72-position indicator in Fig. 16. Since there are but 64 different symbols, eight of the belt positions are duplicates of eight others and may carry the same symbols, namely, positions 1 and 9, 10 and 18, 19 and 27, etc. This is for the reason that the front wheel has two positions selectable by the same signal 000, these being positions 9 and 10, 18 and 19, etc.

It will be evident that a very material saving in space is effected in this indicator since the front wheel is but slightly more than one-eighth the size that would be required to provide the 64 different symbol spaces on a single drum.

Fig. 14 shows circuits for translating the five-unit teletype code to a six-unit code for the control of the indicator of Fig. 13. These circuits are similar to those of Fig. 11 already described except that the elements for preventing the delivery of non-selectable signals are not required since the indicator of Fig. 13 is provided with a 72-position belt.

Although we have herein shown and described several forms of indicator mechanism embodying our invention, it is understood that various changes and modifications may be made therein within the scope of the appended claims without departing from the spirit and scope of our invention.

Having thus described our invention, what we claim is:

1. In combination, an indicator comprising a member having a plurality of positions each selectable by a binary code signal, a motor for moving said member, a normally open circuit for said motor, a set of two-position contacts actuated by said member for selectively establishing connections from a corresponding set of control wires to said motor circuit, said contacts assuming a different combination of positions in each selectable position of said member, the number of selectable positions being less than $2^n$ when $n$ is the number of control wires, control means for said indicator comprising a second set of two-position contacts each connected to one of said control wires, control means adapted to operate the contacts of said second set in $2^n$ different combinations of positions to supply energy to said motor circuit when the contacts of the two sets are in dissimilar positions, and means for preventing such supply of energy when the combination of positions of the contacts of said second set is one which is not selectable by the movement of said member.

2. In combination, an indicator comprising a member having a plurality of positions each selectable by a binary code signal, a motor for moving said member, a normally open circuit for said motor, a set of two-position contacts actuated by said member for selectively establishing connections from a corresponding set of control wires to said motor circuit, said contacts assuming a different combination of positions in each selectable position of said member, the number of selectable positions being less than $2^n$ when $n$ is the number of control wires, control means for said indicator comprising a second set of two-position contacts each connected to one of said control wires, control means adapted to operate the contacts of said second set in $2^n$ different combinations of positions to supply energy to said motor circuit when the contacts of the two sets are in dissimilar positions, and circuit means acting when the contacts of said second set through error are caused to assume a combination of positions corresponding to a signal which is non-selectable by the movement of said member for supplying a distinctive error signal to said control wires in lieu of said non-selectable signal, said error signal corresponding to one of the selectable positions of said member.

3. In combination, an indicator comprising a movable member having a plurality of selectable positions for the display of teletype symbols each identified by a five-unit binary code signal and by a preceding letter-shift or figure-shift code signal, a motor for moving said member, a normally open circuit for said motor, a set of six two-position contacts actuated by said member for establishing connections from a corresponding set of six control wires to said motor circuit, said contacts assuming a distinctive combination of positions in each selectable position of said member, control means for said indicator comprising a second set of six contacts each connected to one of said control wires, with means for operating five of the contacts of the second set in accordance with the binary code signals for the different symbols and for operating the sixth contact in accordance with the character of said preceding letter-shift or figure-shift code signal, the contacts of said second set being effective to supply energy to said motor circuit over said control wires when the two sets of contacts are in dissimilar positions.

4. In combination, an indicator having a member movable by a motor to display symbols corresponding to code signals supplied to said indicator, a normally open circuit for said motor, a set of two-position contacts actuated by said member for selectively establishing connections from a set of control wires to said motor circuit, means including said contacts for supplying a code signal to said control wires when said motor circuit is open to indicate the symbol which is being displayed by said member, control means for supplying code signals to said control wires for moving said member, a starting contact effective when operated to complete said motor circuit provided the code signal supplied to the control wires by said control means does not correspond to the position of said indicator, and means including a stick relay controlled by said starting contact for opening said motor circuit when said member reaches the position designated by the signal supplied to said control wires.

5. A display indicator having a movable member comprising a belt mounted on two wheels for movement to different selectable positions for the display of symbols, said wheels being arranged to have a characteristic relative position for each different belt position, a motor circuit effective when closed to cause rotation of said belt, a positioning device for aligning said belt in a selected position when said motor circuit is open, and control means for closing said motor circuit to operate the belt to different selectable positions comprising a number $n$ of circuit controllers actuated by said wheels and arranged to open or close connections to said motor circuit in $2^n$ different code combinations which identify the different belt positions.

6. A display indicator having a rotatable member comprising a belt having selectable positions for the display of symbols on its surface and two interconnected wheels for rotating the belt to display different symbols, said wheels being of such size that their circumferences correspond to different numbers of said positions so chosen that the product of said numbers equals the total number of display positions, a motor for rotating said member, a set of $n$ circuit controllers actuated by said wheels in such manner as to assume $2^n$ different relative positions during one rotation of said member, an operating circuit for said motor including said circuit controllers, a positioning device for holding said movable member in a position to display a selected symbol when said operating circuit is open, and control means comprising a set of $n$ contacts operable to any of said $2^n$ relative positions for supplying energy to said operating circuit over one or more of said circuit controllers to effect the rotation of said member to a selected display position identified by the relative positions of said control contacts.

7. A display indicator having a movable member with symbols on its surface for display one at a time in a window in the face of the indicator, with means for moving said member to different selectable positions for the display of different symbols, comprising two wheels of different size and a motor for rotating said wheels to different positions corresponding to the different selectable positions of said member, the size of the wheels being such that the product of the numbers of positions which the wheels may assume equals the total number of selectable positions and the wheels have a characteristic relative position for each such position, a relay for controlling the operation of said motor, means for operating said relay, and means controllable in accordance with the relative position of said two wheels for releasing said relay to stop the operation of said motor.

8. A display indicator having a movable member with symbols on its surface for display one at a time in a window in the face of the indicator, means for moving said member to different selectable positions to display said symbols, comprising two wheels of different size and a motor for rotating said wheels, position selecting means comprising a circuit including said motor and a set of $n$ circuit controllers some of which are actuated by one wheel and the remainder by the other wheel, said circuit controllers being arranged to assume at least $2^n$ different relative positions as said member is moved to its different positions, and remote control means for connecting a source of energy to one or more of said circuit controllers in accordance with different code signals each having $n$ elements arranged in a combination which identifies a particular symbol, each such signal being effective to complete the circuit for said motor over one circuit controller or another in all positions of said movable member except the one where the corresponding symbol is displayed.

9. In combination, an indicator having a member movable by a motor to display symbols corresponding to code signals supplied to said indicator, a normally open circuit for said motor, a set of two-position contacts actuated by said member for selectively establishing connections from a set of control wires to said motor circuit, said contacts assuming a distinctive combination of positions in each indicator position corresponding to the code signal for the symbol displayed in such position, means including a manually operable contact for completing said motor circuit effective when said control wires are supplied with a code signal which does not correspond with the symbol displayed by said indicator, and relay means controlled by said manually operable contact for maintaining said motor circuit closed until a position is reached where the symbol displayed is one corresponding to the code signal supplied to said control wires.

10. In combination, an indicator comprising a member movable to a plurality of positions selectable by binary code signals, a motor for moving said member having a normally open motor circuit, a set of two-position control contacts operable in different combinations each constituting a binary code signal for selecting the position to which said member is to be moved, a second set of contacts which assume different relative positions in response to the movement of said member in accordance with different binary signals each of which identifies a selectable position of said member, said two sets of contacts being so arranged that each contact of one set is connected by an individual control wire to a corresponding contact of the other set, and that each contact in each set in one position connects one terminal of a source of energy to its control wire and in its other position is adapted to supply energy received over its control wire to the motor circuit, and means including a stick relay for connecting said motor circuit to the other terminal of said source to complete said circuit so arranged that said relay is supplied with energy over one or more control wires in all positions of said indicator except the one in which the energization of said control wires is in accordance with the code signal which identifies such one position, and releases to disconnect the motor when the indicator reaches such one position.

11. A display indicator having a movable member comprising a belt mounted on two wheels for movement to different selectable positions for the display of symbols, said wheels being arranged to have a characteristic relative position for each different belt position; a motor circuit effective when closed to cause movement of said belt by said wheels, and control means for closing said motor circuit to move said belt to different selectable positions including two sets of two-position contacts, one set of contacts being actuated by said wheels, means remotely controlled for actuating the other set of contacts in different combinations which identify the particular symbol to be displayed, each individual contact of one set being connected by a control wire to a corresponding contact of the other set so that each contact connects its control wire to the motor circuit or to a source of energy, and a control wire for said motor circuit connected to each of the contacts of the second set of contacts in one position of said contacts.

References Cited in the file of this patent
UNITED STATES PATENTS

| | | |
|---|---|---|
| 2,273,776 | Zurek | Feb. 17, 1942 |
| 2,279,009 | Nichols | Apr. 7, 1942 |
| 2,397,604 | Hartley et al. | Apr. 2, 1946 |
| 2,441,557 | Bowne | May 18, 1948 |
| 2,471,126 | Spencer et al. | May 24, 1949 |
| 2,476,673 | May et al. | July 19, 1949 |
| 2,520,142 | Herbst | Aug. 29, 1950 |
| 2,630,552 | Johnson | Mar. 3, 1953 |
| 2,676,289 | Wulfsberg et al. | Apr. 20, 1954 |

FOREIGN PATENTS

| | | |
|---|---|---|
| 448,935 | Germany | Aug. 11, 1927 |